Patented June 28, 1932

1,865,062

UNITED STATES PATENT OFFICE

KARL SCHIRMACHER, OF FRANKFORT-ON-THE-MAIN-HOCHST, AND KONRAD STENGER, OF FRANKFORT-ON-THE-MAIN, GERMANY, ASSIGNORS TO GENERAL ANILINE WORKS, INC., OF NEW YORK, N. Y., A CORPORATION OF DELAWARE

AZO DYESTUFF AND ACETATE SILK DYED THEREWITH

No Drawing. Application filed September 29, 1930, Serial No. 485,293, and in Germany October 20, 1926.

The present invention relates to new azo dyestuffs and to acetate silk dyed therewith.

The new dyestuffs correspond with the following general formula:

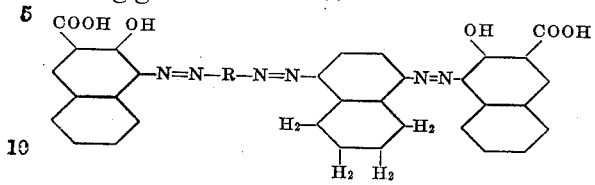

wherein R stands for an aromatic residue which may be substituted and wherein the two azo groups linked to R stand in para-position to each other. They are obtainable by coupling a tetrazotized compound of the following general formula:

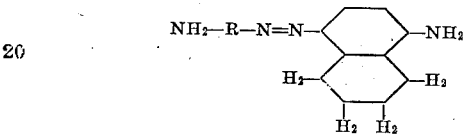

wherein R stands for an aromatic residue which may be substituted and the amino group linked to R stands in para-position to the azo group, with two molecular proportions of 2.3-hydroxynaphthoic acid.

Our new dyestuffs yield navy blue to black shades on acetate silk and the like materials. A preferred method of dyeing cellulose acetate fibers comprises dyeing the fibers with a diamino-azo-dyestuff of the above given general formula, tetrazotizing the compound on the fiber and coupling it with 2.3-hydroxynaphthoic acid. The dyeings thus obtained show good discharge properties. The starting materials which are used in our process as tetrazo components are obtainable, for instance, by coupling a diazotized aromatic para-nitramine with α-amino-tetra-hydronaphthalene and subjecting the product thus obtained to a reducing process, or by coupling a diazotized aromatic mono-acetyl-p-diamine with α-amino-tetra-hydronaphthalene and subjecting the compound thus obtained to a saponifying process.

The following examples serve to illustrate the invention, but they are not intended to limit it thereto;

(1) 0.5 gram of the hydrochloride of the compound of the following constitution:

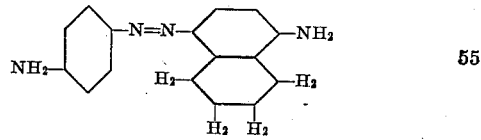

is made into a paste with 100 ccm. of water containing 5 ccm. of aqueous hydrochloric acid of 1:10. The mixture thus obtained is made up with water to 4 liters, and 30 grams of sodium acetate are added thereto.

100 grams of acetate silk are dyed for ¾ hour at 70° C.–75° C. in the said mixture. The material is then squeezed, rinsed and the dyeing is tetrazotized for 20 minutes at 10° C.–15° C. by means of 4 per cent of sodium nitrite and 10 per cent of hydrochloric acid. The material is squeezed again, rinsed and introduced at 60° C.–70° C. into the developing bath prepared as follows:

2.5 grams of β-hydroxynaphthoic acid are dissolved in boiling water while 1.0 gram of calcined sodium carbonate, and 2.5 grams of caustic soda solution of 40° Bé. are added. The solution is made up with water to 4 liters and acetic acid is added thereto, until the bath shows a weakly acid action. The acetate silk is dyed for about 20–30 minutes in the said bath, squeezed, rinsed, soaped at 70° C.–80° C. by means of 2–3 grams of Marseilles' soap, rinsed and dried. There is obtained an intense, vivid navy-blue dyeing of good discharge properties.

(2) The compound of the following formula:

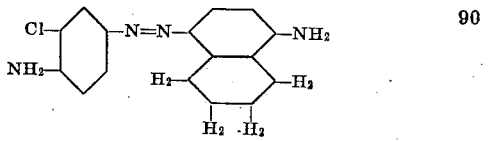

when dyed in an analogous manner as indicated in Example 1 on the cellulose acetate fiber, yields, after being tetrazotized on the fiber and coupled with 2.3-hydroxynaphthoic acid, more reddish tints.

(3) The compound of the following formula:

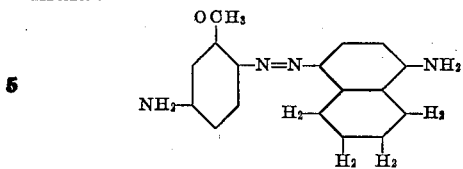

when dyed in an analogous manner as indicated in Example 1 on the cellulose acetate fiber, yields, after being tetrazotized on the fiber and coupled with 2.3-hydroxynaphthoic acid, navy-blue shades of a greenish tint.

(4) The compound of the following formula:

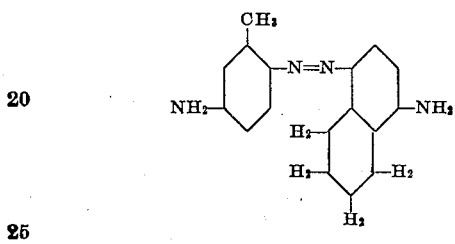

when dyed in an analogous manner as indicated in Example 1 on the cellulose acetate fiber, yields, after being tetrazotized on the fiber and coupled with 2.3-hydroxynaphthoic acid, navy-blue shades.

In an analogous manner the dyestuffs may be prepared in substance or on another suitable substratum.

We claim:

1. A new method of dyeing navy-blue to black shades on cellulose acetate fiber or the like which comprises dyeing the materials with a compound of the following general formula:

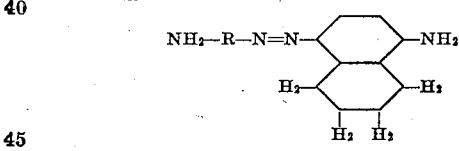

wherein R stands for a benzene residue which may be substituted by halogen, alkyl or alkoxy groups and the amino group linked to R stands in para-position to the azo-group, tetrazotizing the compound on the fiber and coupling it with 2.3-hydroxynaphthoic acid.

2. A new method of dyeing navy-blue shades on cellulose acetate fiber or the like which comprises dyeing the materials with a compound of the following probable formula:

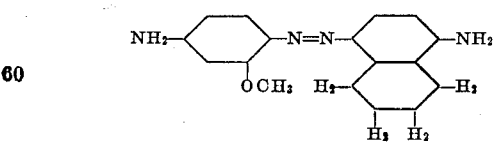

tetrazotizing the compound on the fiber and coupling it with 2.3-hydroxynaphthoic acid.

3. As new products, the compounds of the following formula:

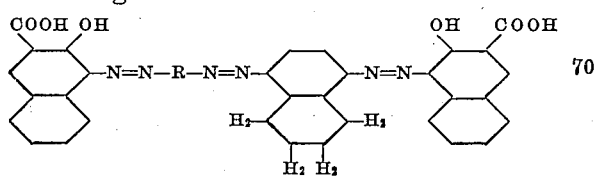

wherein R stands for a benzene residue which may be substituted by alkyl, alkoxy or halogen and the two azo groups linked to R stand in para-position to each other, yielding when produced on cellulose acetate fiber navy-blue shades.

4. As a new product, the compound of the following probable formula:

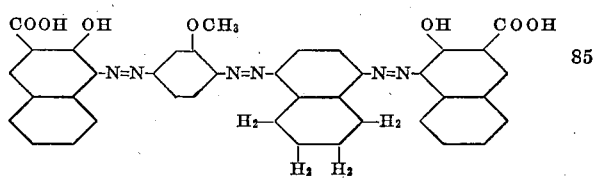

yielding when produced on cellulose acetate fiber a navy-blue shade of a greenish tint.

5. Acetate silk dyed with the dyestuff claimed in claim 3.

6. Acetate silk dyed with the dyestuff claimed in claim 4.

7. As a new product, the compound of the following probable formula:

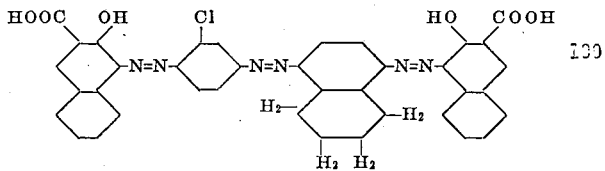

yielding when produced on cellulose acetate fiber a navy-blue dyeing.

8. As a new product, the compound of the following probable formula:

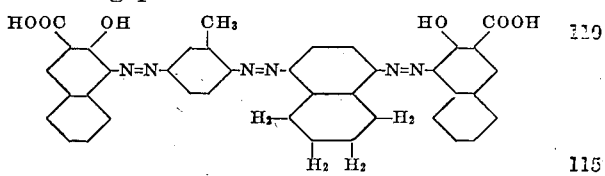

yielding when produced on cellulose acetate fiber a navy-blue dyeing.

9. Acetate silk dyed with the dyestuff claimed in claim 7.

10. Acetate silk dyed with the dyestuff claimed in claim 8.

In testimony whereof, we affix our signatures.

KARL SCHIRMACHER.
KONRAD STENGER.